United States Patent
Tom et al.

(10) Patent No.: US 8,209,384 B2
(45) Date of Patent: Jun. 26, 2012

(54) PERSISTENT GROUP-BASED INSTANT MESSAGING

(75) Inventors: Allen Tom, San Francisco, CA (US);
Adrien Cahen, San Jose, CA (US);
Bryce Glass, Columbus, OH (US);
Xavier Legros, Redwood City, CA (US)

(73) Assignee: Yahoo! Inc., Sunnyvale, CA (US)

(*) Notice: Subject to any disclaimer, the term of this patent is extended or adjusted under 35 U.S.C. 154(b) by 696 days.

(21) Appl. No.: 11/877,604

(22) Filed: Oct. 23, 2007

(65) Prior Publication Data

US 2009/0106376 A1 Apr. 23, 2009

(51) Int. Cl.
*G06F 15/16* (2006.01)
(52) U.S. Cl. .................. 709/206; 709/203; 709/204
(58) Field of Classification Search .......... 709/203–206, 709/227; 455/461, 466
See application file for complete search history.

(56) References Cited

U.S. PATENT DOCUMENTS

| | | | | |
|---|---|---|---|---|
| 7,774,407 B2 * | 8/2010 | Daly et al. | | 709/204 |
| 2002/0078153 A1 * | 6/2002 | Chung et al. | | 709/204 |
| 2003/0065721 A1 * | 4/2003 | Roskind | | 709/204 |
| 2006/0053208 A1 * | 3/2006 | Laurila et al. | | 709/206 |
| 2007/0005704 A1 * | 1/2007 | Heron et al. | | 709/206 |
| 2007/0005707 A1 * | 1/2007 | Teodosiu et al. | | 709/206 |

OTHER PUBLICATIONS

Osterfeld, F., Kiesel, M., Schwarz, S.:"Nabu—A Semantic Archive for XMPP Instant Messaging". In: Semantic Desktop Workshop at the ISWC (2005), [retrieved from the Internet "http://www.dfki.uni-kl.de/~schwarz/docs/Nabu-ProjectThesis.pdf" on Aug. 13, 2009].*
Bhagyavati, B., "Instant messaging usage policies enable ubiquitous communication";Columbus State Univ., GA, USA; Wireless Telecommunications Symposium, 2005; Apr. 28-30, 2005; pp. 45-48. [retrieved from IEEE database on Aug. 13, 2009].*
Bin Wang, John Bodily, Sandeep K. S. Gupta, Supporting Persistent Social Groups in Ubiquitous Computing Environments Using Context-Aware Ephemeral Group Service, Proceedings of the Second IEEE International Conference on Pervasive Computing and Communications (PerCom'04), p. 287, Mar. 14-17, 2004.*
David Fono, Ron Baecker, Structuring and supporting persistent chat conversations, Proceedings of the 2006 20th anniversary conference on Computer supported cooperative work, Nov. 4-8, 2006, Banff, Alberta, Canada [retrieved from ACM database on Apr. 7, 2010].*

* cited by examiner

*Primary Examiner* — Philip Chea
*Assistant Examiner* — LaShanya Nash
(74) *Attorney, Agent, or Firm* — Hickman Palermo Truong Becker Bingham Wong LLP

(57) ABSTRACT

A system for managing an instant messaging conversation in a persistent context is provided. The system has an archiving feature for convenient access to the conversation, even after the conversation has ceased.

33 Claims, 8 Drawing Sheets

Steps to Creating an Instance

1 Enter a name for your instance

[_____] [check availability]

2 Describe* your instance

[_____]

Provide some tags? (comma-separated)

[_____]

☐ Auto-suggest tags based on list conversations? (Learn More)

3 Who can join?
  ○ Open: Anyone can join
  ○ Invite-only: List moderators must invite new members
  ○ Approval: Anyone can ask to join, moderators must approve

[create]

PERSISTENT GROUP-BASED INSTANT MESSAGING

FIELD OF THE INVENTION

The invention relates to instant messaging system and, more particularly, to a non-ephemeral instant messaging system that is permanent and always available.

BACKGROUND OF THE INVENTION

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Instant messaging (IM) is a form of real-time message communication between two or more people. Typically, the communication is in the form of text. The text entered in one computer involved in an IM conversation is conveyed to one or more other computers involved in the conversation over a network, such as but not limited to the Internet.

IM typically requires the use of a client program that facilitates an instant messaging service. Alternatively, an IM service may be used via, for example, a web browser. IM differs from e-mail in that conversations occur in real-time. Most IM services also offer a "presence information" feature, indicating whether people on a user's contact list are currently online and available to chat.

Typically, to initiate an IM conversation with a contact or "friend", a user selects an icon representing the friend, which causes a conversation window to display. A conversation window typically includes a conversation history window and a text entry area. The text entry area displays a message that a user currently types but has not yet sent, whereas the conversation history window displays the messages sent to and received from the friend, at least since the conversation window has been opened.

In order to conduct a shared conversation, in which more than two participants are able to view and respond to all messages from other participants, a chat room must be created. The creation process for a chat room requires that, at inception, an individual must request and obtain the use of resources such as, but not limited to, the client program referred to earlier, and must manually invite other participants to join the new chat room.

A chat room remains in existence only as long as there is at least one active participant. Chat servers differ in how they measure activity. Permanent chat rooms or IRC sessions sometimes use "bots" that stay alive within the chat room all the time and thus prevent the chat room from closing. In most cases, after the last participant leaves a chat room, the chat room is automatically deleted. When a chat room is deleted, the memory resources reserved for the chat room on the chat server are released.

If a group conversation is to continue across multiple sessions, then a new room must be created. The new room has no history of what conversation may have transpired in prior sessions of the same conversation, nor even that any such prior sessions existed.

The process of creating a chat room and inviting all the participants is very time consuming and cumbersome, especially in situations where conversations frequently involve the same set of participants. Additionally, chat rooms are transient and must be re-created once all the participants leave the room. Consequently, a system that addresses these and other messaging and chat room problems is desired.

BRIEF DESCRIPTION OF THE DRAWINGS

The embodiments of the invention are illustrated by way of example, and not by way of limitation, in the figures of the accompanying drawings and in which like reference numerals refer to similar elements and in which

FIGS. 5A-5B and show further example user interfaces for an administrator, according to alternative embodiments of the invention;

DETAILED DESCRIPTION OF THE PREFERRED EMBODIMENTS

In the following description, for the purposes of explanation, numerous specific details are set forth in order to provide a thorough understanding of the various embodiments of the invention. It will be apparent, however, that the various embodiments of the invention may be practiced without these specific details. In other instances, well-known structures and devices are shown in block diagram form in order to avoid unnecessarily obscuring the invention.

In the following description, the various features of the invention are discussed under topic headings that appear in the following order:
Functional Overview
Architectural Overview
Messaging Engine
Example User Interfaces
Managing Variations in Client Capability
Administrator Features
Archiving Features
Security Aspects
HTML Widget
Potential Uses of Persistent-IM-Groups
Computer System Implementation
Functional Overview A system is described hereafter which allows participants in a group-based instant messaging conversation to spread the conversation across multiple sessions without having to restart the group formation process. In one embodiment, the subscribers initially subscribe to a group IM session, where each group is associated with an identifier (referred to herein as a group-IM identifier). The subscriber-to-identifier information is stored and archived, for example within an IM server. After the subscriber-to-identifier information has been established for a particular group, members of the group can send messages to all other members of the group simply by directing their messages to the group's identifier.

In one embodiment, the metadata for each group, as well as the history of the group conversation, is maintained at the IM server between sessions. Consequently, the group continues to exist as an entity to which subscribers of the group can direct messages even after all subscribers of the group have logged out of the IM session. Further, subscribers of the group are able to search the server-stored history of the IM conversation to retrieve previously-sent messages.

Architectural Overview

Figure 1:
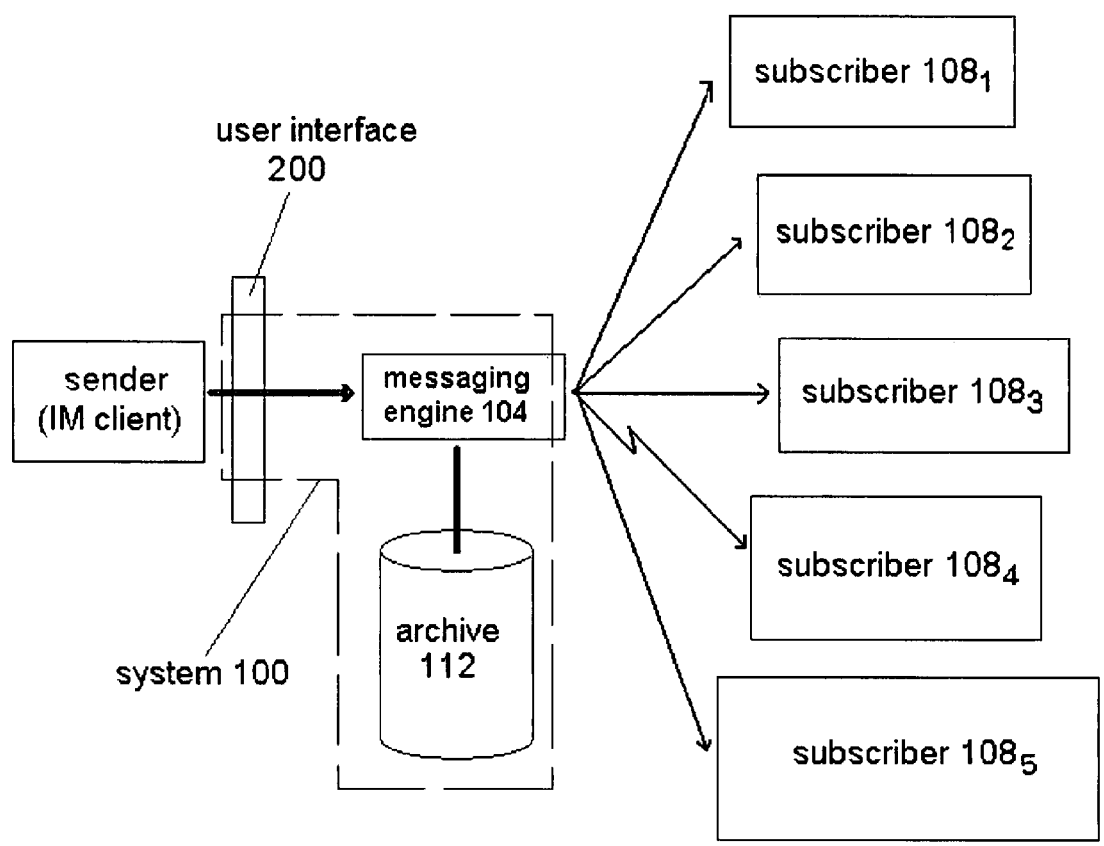
FIG. 1 is a plan view of a messaging engine which receives and dispatches IMs, according to an embodiment of the invention.

FIG. 1 is a block diagram of a system 100 used for multi-session group IM conversations. The broadcasting of the various instant messages is managed by a messaging engine 104, which also handles various routing and data-management tasks. As depicted in FIG. 1, the system 100 comprises a messaging engine 104, and various user interfaces 200 which provide access for the subscribers 108. The messaging engine 104 listens for incoming instant messages to a specific identifier 204. All incoming messages sent to that identifier 204 are then broadcast to all subscribers 108. These messages are stored in a server-side archive 112.

Messaging Engine

The messaging engine 104 dispatches and broadcasts messages from one subscriber to numerous others. The messaging engine 104 is also responsible for storing those messages, and must simultaneously be listening for new messages. In an example embodiment, the messaging engine 104 has an event loop in which it connects to the real time messaging network, waits for incoming messages, and then broadcasts them out to all subscribers.

In an example embodiment, the messaging engine 104 can be written in PERL and connects to the real time messaging network using public interfaces into these networks. However, the messaging engine 104 could be implemented using any programming language or platform as long as the language and platform provides interfaces to connect to the real time messaging networks used for IM communications.

Another feature not available before Web 2.0 is the ability of the messaging engine 104 to publish content to an RSS feed, which is a machine readable format that any RSS reader or RSS client can consume. These are all considered Web 2.0 features. However, the system 100 would still work in an environment which conforms only to Web 1.0.

Example User Interfaces

Figure 2:
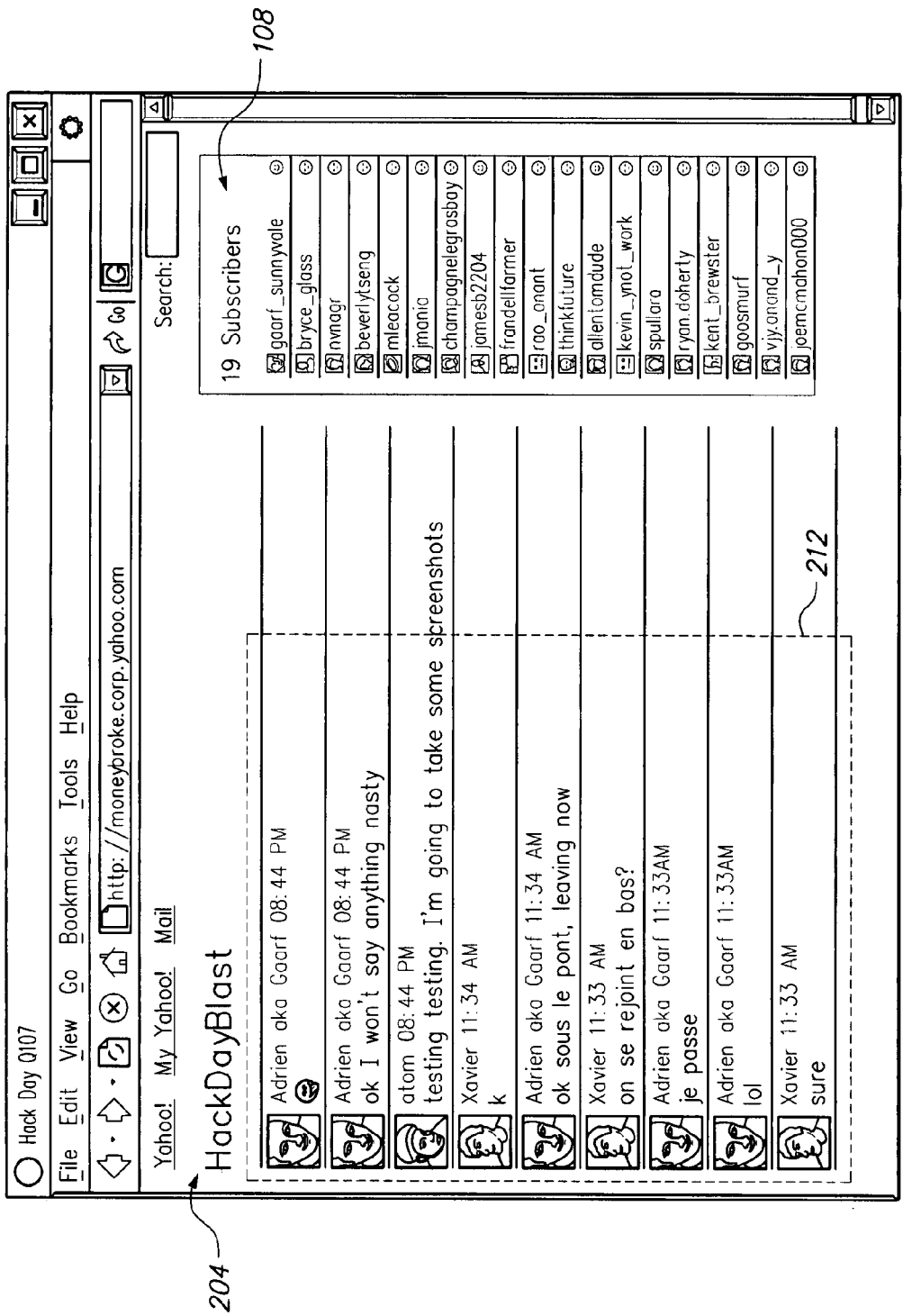
FIG. 2 depicts an example user interface as seen by a subscriber, according to an embodiment of the invention.
Figure 3:
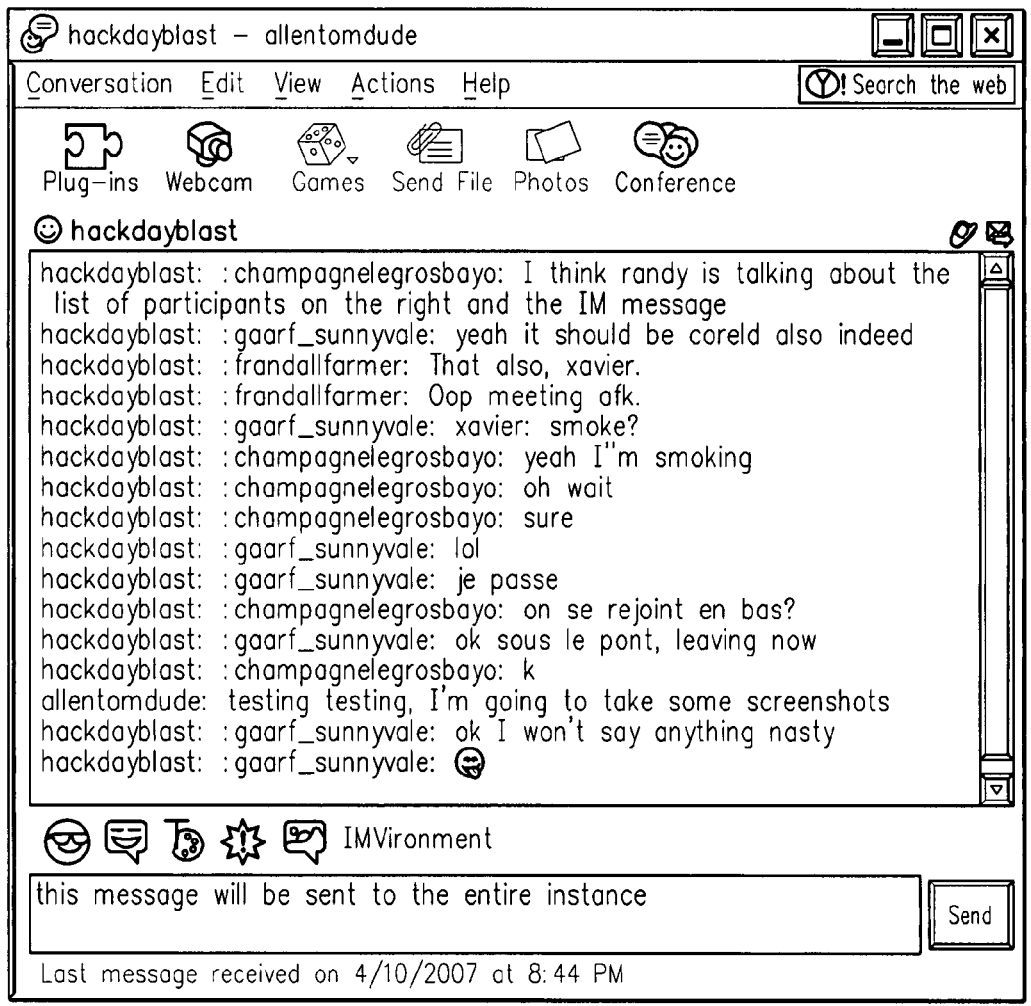
FIG. 3 illustrates an example conversation window of an IM client, according to an embodiment of the invention.

An example user interface 200 for using the system 100 is shown in FIG. 2. The user interfaces shown in FIGS. 2 and 3 are for exemplary purposes only, and should not be considered as limiting to any specific implementation. The user interface 200 is shown with an identifier 204, and the subscribers 108 in a listed form.

As shown in FIG. 2, the user interface 200 uses a single identifier 204 to facilitate group conversations. Subscribers of the system 100 can send an instant message to the group's identifier 204. The system 100 then broadcasts the message to all other participants (shown in the subscriber list 108). Likewise, other participants may respond to the original message by replying back to that identifier 204. In FIG. 2, that identifier 204 is "HackadayBlast", although this name is for example purposes only.

The user interface 200 illustrates how all messages sent to the HackdayBlast identifier 204 are displayed in a single IM window 212, in Yahoo Instant Messenger (YIM) format. However, although the YIM format is shown in FIG. 2, the techniques described herein are not limited to that or any specific display format.

Within FIG. 2, from the perspective of sender subscriber 108, the user is having a single conversation with the HackDayBlast ID. However, all messages sent to the HackDayBlast identifier 204 are broadcast to all subscribers 108. When a subscriber that belongs to persistent-IM-group signs onto the user interface 200, they are automatically logged in to the persistent-IM-group.

The system 100 further allows subscribers without a user interface 200 to participate in a persistent-IM-group by using their web browser to send and receive messages, or to use any RSS reader to read messages. As shown in FIG. 2, when the subscribers 108 sign themselves out of the system 100, the status of those subscribers changes to unavailable. Subscribers 108 that are signed out do not see messages that are sent after the time of log out. However, due to the archiving features of the system 100, those subscribers 108 can still later see what was communicated.

Managing Variations in Client Capability

Figure 4:
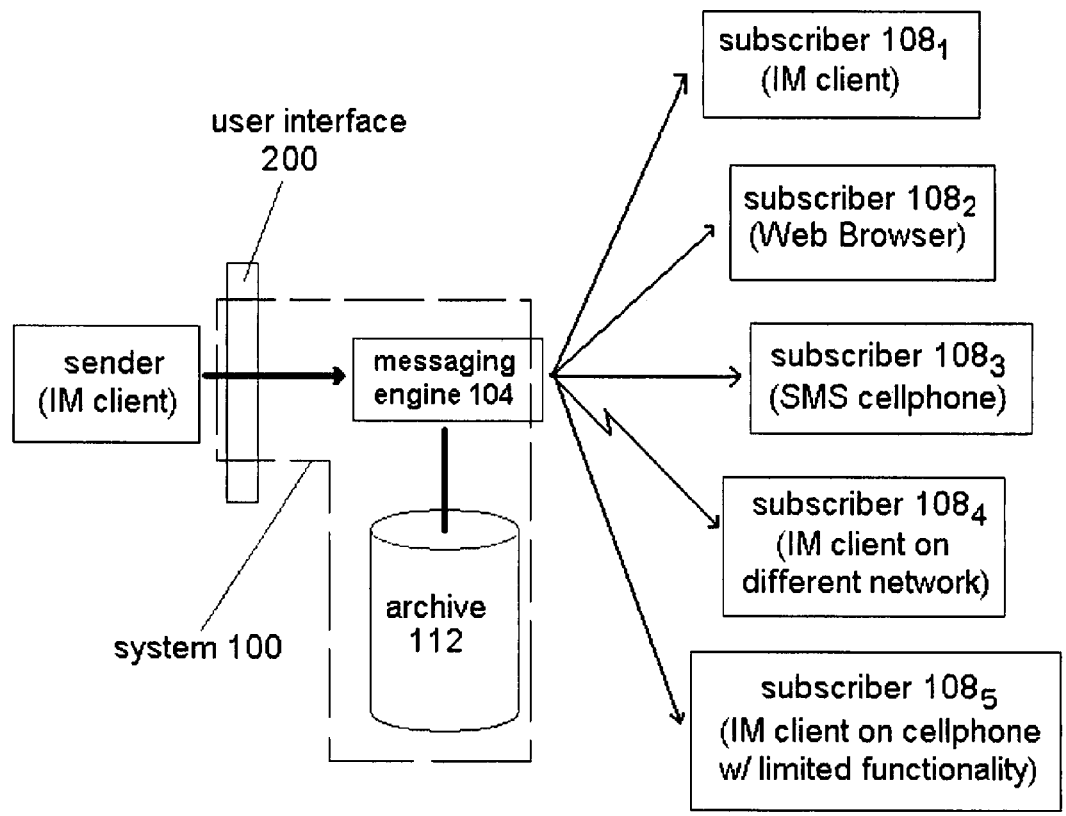
FIG. 4 illustrates the clients of FIG. 1 in greater detail.

In FIG. 4, a sender (IM client) is shown sending a message through the messaging engine 104 to a variety of subscribers $108_{1-5}$, each with differing IM capabilities. The messaging engine 104 is responsible for tracking the IM capabilities of these subscribers 108. For example, not all web browsers will have the user interface 200 integrated within. A subscriber that does not have a web browser with an integrated user interface 200 is shown by subscriber $108_2$.

To use the system 100, no special IM client software is required. However, a user interface such as the user interface 200 could enhance the usability of features of the system 100. A user with access to the user interface 200 will have advantages such as animated emoticons and also potentially file sharing resources. However, various of the subscribers 108 may have devices that cannot accommodate this.

Accordingly, to use the system 100, no special IM client software is required. Existing IM systems often require users to download and install new IM client software to enable new features. In doing so, downward compatibility can be compromised. Accordingly, new features are often very slow to be adopted, due to the reluctance of the existing subscriber base to upgrade their subscriber software. Also, advanced IM features are often entirely unavailable in environments in which lightweight or feature-limited clients are deployed, such as mobile computing devices, TV set-top boxes, cellphones, PDAs, and other non-mainstream IM platforms.

Avoiding this burden of requiring new software allows for the widest possible audience, and lowers potential barriers to entry for mass adoption. Also, extending IM functionality to lightweight or non feature-rich clients also allows for the possibility for widespread adoption by non traditional clients, which as stated could include at least mobile phones, PDAs, and even living room entertainment consoles such as set top boxes. Thus, the software module 100 aggregates data, but its subscribers 108 can utilize many different data formats.

In an example embodiment, the messaging engine 104 tracks the capabilities and limitations of each communication network and of each subscriber 108, in order to properly route and format messages. To accommodate this variety of potential clients, as shown in FIG. 4, the system 100 relieves the subscribers $108_{1-5}$ from having the responsibility of informing the messaging engine of the specific capabilities of their client interface. Because of this, the system 100 may be used by even the most basic IM clients.

Using FIG. 4 as an example, a message sent to the cell phone $108_3$ via an SMS network will need to be stripped down compared to a message sent to a computer 108, with the user interface 200 installed. If a user were to sending an emoticon, the subscriber $108_3$ linked through an SMS service might only see a text version, while someone else subscribed via their web browser might see an animated smiley that zooms around the page.

The system 100 also has web facing features which can take advantage of the recent Web 2.0 protocols, as promulgated by the World Wide Web Consortium (W3C). Specifically, the user interface 200 that is viewable within a web browser. The messaging engine 104 has the ability to publish content to a Web 2.0 badge, which is an embeddable UI widget that websites can embed. These badges can be updated in real time without requiring that the web page be reloaded. The messaging engine 104 also has the ability to publish content to a web page in real time without requiring that the page be reloaded when new messages are sent to the list after the page is initially loaded.

The messaging engine 104 can transparently send messages to any network that it is connected to, without the participants knowing that their messages crossing from one network into another. The messaging engine 104 can act as a bridge across multiple communication networks. For example, the messaging engine 104 can simultaneously be connected to IM networks belonging to any of Yahoo, AOL, MSN, as well as other IM providers, and can also have access to SMS resources such as those used by cellular telephone providers. An example of this is shown in FIG. 4, in which a subscriber $108_4$ is on a different network.

The system 100 thus sets up SMS gateway, filters info not suitable for non-clients, and routes the messages to a wide variety of differing technology means and different IM protocols/networks. The system 100 allows persons to IM directly from a web browser, and does not require the user interface 200, although the user interface 200 can make the experience of using the system 100 richer.

Administrator Features

Figure 5B:
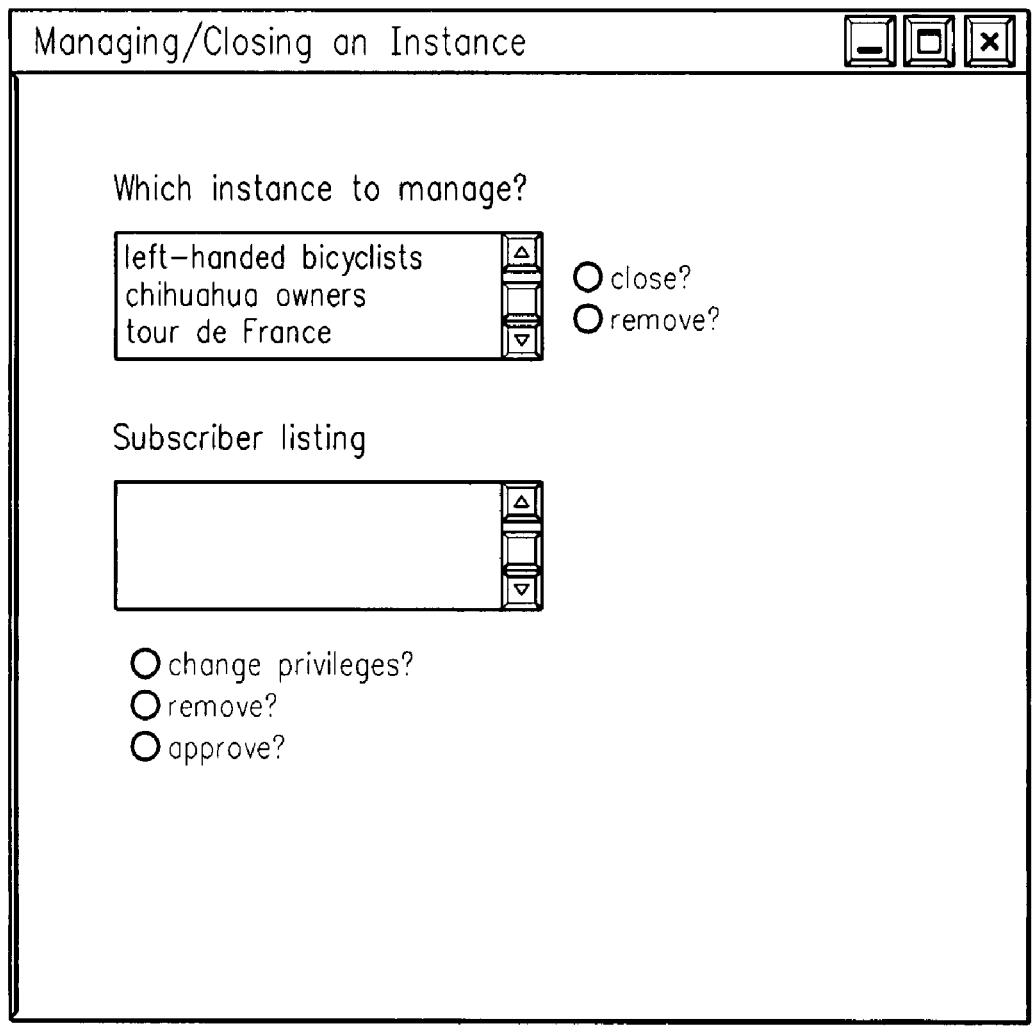

A subscriber accessing a persistent-IM-group does so through a subscription, which is managed by an administrator of the persistent-IM-group. FIGS. 5A-5B depict example user interfaces 504, 508 which allow administrators to manage subscriptions to existing persistent-IM-groups, and also create new persistent-IM-groups. FIG. 5A shows an example user interface 404 for adding and screening subscribers to an existing persistent-IM-group. The user interface 404 also has a facility for removing subscribers when they spam or flame. The user interface 404 can also assist in choosing an identifier 204, and verifying that the chosen identifier is not already taken by someone else.

FIG. 5B depicts how to close off a specific persistent-IM-group 100, so that further messages will not be received. The ability to close off may be useful for example when a project is completed (the plane is built, or the Tour de France or other sporting event is over), so that further messages to the persistent-IM-group are unlikely. However, archives of the messages within a specific persistent-IM-group may still be useful, such as if it is desired to build another similar plane. Thus, to close off a group does not remove it from existence entirely.

As shown in FIG. 5B, the user interface 508 can merely close the persistent-IM-group, or also take that group out of existence entirely (remove). The user interface 508 also lists all subscribers 108 subscribed to a particular persistent-IM-group. User interface 508 also provides a way for an administrator remove certain of those subscribers.

As shown in FIG. 5B, the user interface 508 also displays (a) subscription requests from prospective new subscribers and (b) a mechanism for an administrator to approve or reject the requests. Thus, the system 100 supports configuring specific persistent-IM-groups to allow new subscribers to be approved by an administrator before joining.

Archiving Features

The system 100 also has an archiving feature not found in typical IM environments. Some IM mechanisms allow individual clients to archive messages, but only locally, that is, only on the computing device which a user employs to participate in the IM session, and then often not in persistent storage. However, once a user closes their IM session, instant messages are not easily accessible by either a participant or a $3^{rd}$ party, to the extent that the messages are archived at all. Also, existing Instant Messaging mechanisms do not provide a way to view IM logs of past messages using a standard web browser. At present, people who access IM systems spread over several computers are only able to view archives from conversations that were conducted locally on a specific computer.

Conversely, as shown in FIG. 1, the system 100 stores all messages on the archive server 108, so that all messages are archived and are accessible from a central location (server-side). Thus, any subscriber to a particular persistent-IM-group of the system 100 is able to view all archived messages of the particular persistent-IM-group using a standard web browser, even when accessing the archives using a computer that had not accessed the system previously.

Figure 6:
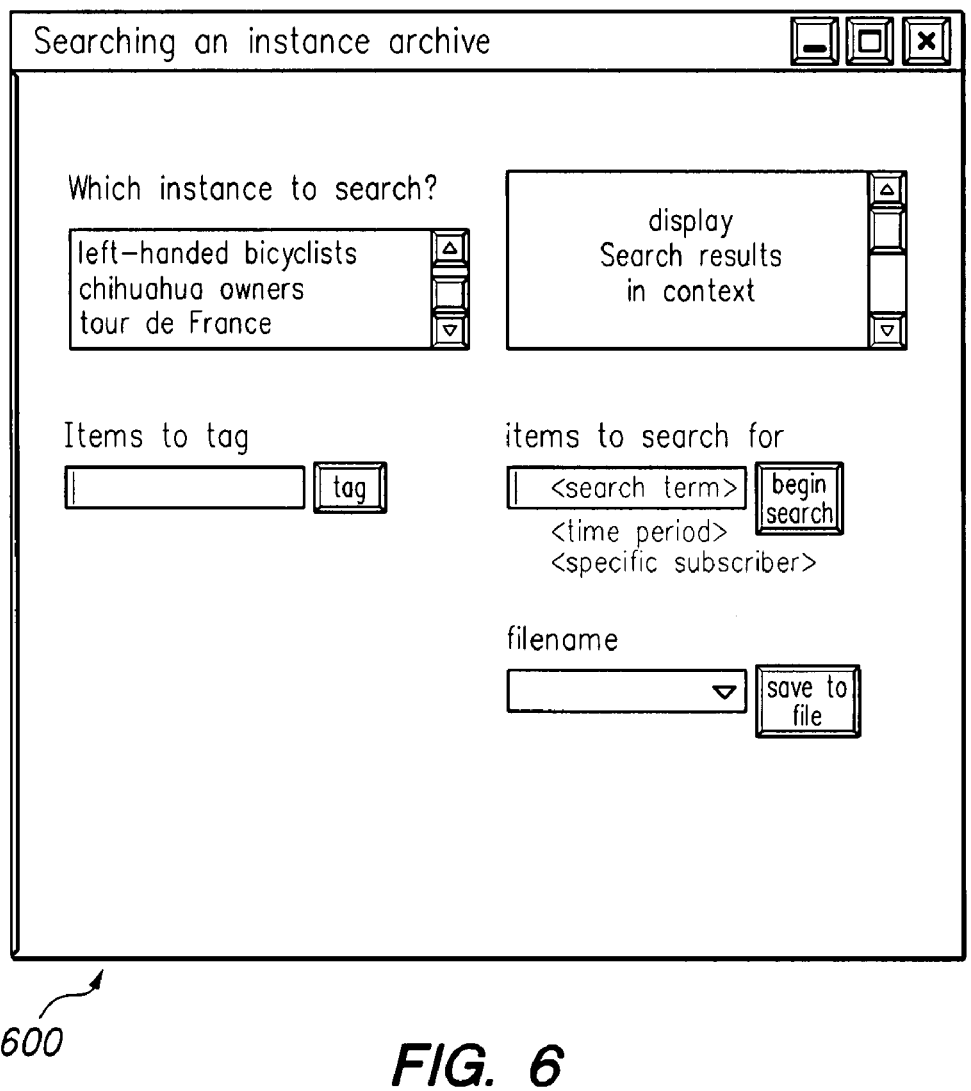
FIG. 6 shows an example user interface for archiving, according to an embodiment of the invention.

One example of such access is shown in FIG. 6, in which a user interface 600 has various archiving features. These features include at least tagging specific text terms, selecting a specific persistent-IM-group to review, as well as searching and file-saving mechanisms. As shown in FIG. 6, the archiving utility 600 can search on all posts by a certain person, day, specific term.

In addition to providing archives in human readable format, within the system 100 all message archives are available in real simple syndication (RSS) format, so that a standard RSS reader is able to access the messages. Publishing the content using RSS allows easy integration with other applications that read RSS, including but not limited to My Yahoo, Yahoo Pipes, and various blog publishing systems.

The system 100 can also support cross-indexing of different subscribers by using the text tagging of text terms described earlier, or but also by using other user-profile mechanisms. These mechanisms could designate for example co-workers, graduates of a specific high school, and cyclists. The system 100 can thus work with professional endeavors, but also with social endeavors such as a bicycle club.

Subscribers can subscribe to persistent-IM-groups in a variety of ways. The example user interfaces of FIGS. 2-3 are exemplary only. Also, the use of RSS is exemplary only. Numerous different publication formats exist, and RSS is but one example of these. Although not shown in FIG. 6, an administrator of the system 100 could designate messages to be archived as public, semi-public, searchable by everyone, searchable only by subscribed persons, or searchable by no one. Additionally, new subscribers can be blocked from earlier archives, different tiers of access, different privileges.

The administrator could also tag (dedicate) certain keywords that may be significant. Using tagging, viewers could go to directory of resources, type a desired search term, and look for relevant hits. The archiving feature of the system 100 could apply a tagging lexicon and protocol to the search terms. For example, a searcher performing a search based on the term "hot dog" may be a different audience than a searcher performing a search based the term "dog".

The system 100 also functions as a micro-blogging utility, except not just for one person but for a group, such as left-handed cyclists in Utah. The system 100 could deliver the current status of a bicycle race, on the spot. Such a feature would save a subscriber from having to go find a laptop or WiFi outlet and update a badge on a website.

The tagging discussed earlier is not limited to content, but also to subscribers, such as a provider being aware that a specific subscriber is left handed. However, it is important to note that tagging could give rise lots of meta information about subscribers, including inaccurate information. Subscribers sometimes do not give accurate answers to profile questionnaires.

Security Aspects

The system 100 also provides various security measures. At present, IM systems that implement chat room functionality force the participants to disclose their Instant Messaging ID when that user enters the chat room. This practice exposes these users to harassment, spam, and potentially other privacy issues. As shown in FIG. 3, specific e-mail addresses are not revealed within the system 100. It is well known that spammers use bots to troll for e-addresses by searching on @ signs. To overcome this problem, the system 100 uses only nicknames (coreIDs) which are not suited for e-mail or IM purposes, again as shown in FIG. 3. Thus, the system 100 also allows subscribers to participate in IM sessions without having to disclose their Instant Messenger IDs. However, under certain circumstances, a network or Information Technology (IT) administrator could configure the system 100 so that a true e-address might be displayed, such as where the subscribers specifically elect to do so.

Many IT administrators or security specialists disallow use of any/all IM use. One reason for this is IM is considered a network security breach. Also, many IT departments block IM because they lack the ability to log and monitor IM conversations conducted by employees while at work. Because the system 100 has a searchable archive of messages, IT departments might be more willing to allow IM access within the workplace using the system 100.

Another reason that IT administrators don't like IM is that IM tools can increase network bandwidth utilization. However, the system 100 addresses this in several ways. One way is by allowing subscribers to log out of the IM utility (thereby freeing up network bandwidth), yet enabling those logged out subscribers to still have access to the archived messages. Another way is by providing for multiple levels of access to a persistent-IM-group, including but not limited to separating subscribers at least into spectators as well as participants.

HTML Widget

A $3^{rd}$ party site, such as but not limited to a social networking site, could also use miniaturized version of the system 100, such as but not limited to an widget which may or may not use HTML. Such a site or blog could embed the widget to allow readers of the blog to participate in a group chat. If access control is desired, the blog author would be able to restrict access, thereby maintaining control over who is allowed to send messages to the system 100. Such a widget would be used to push content to the $3^{rd}$ party site using various IM protocols, or even SMS. For example, a blog author could embed a widget on their blog, and then use YIM, SMS, or other means to update the messages displayed on that widget, even when those messages originate from a mobile device.

The archives of the system 100 are published in RSS format, which is widely accepted content syndication format. Third party websites and applications that accept RSS feeds can display message archives. RSS won't allow other sites and applications to send messages to specific persistent-IM-groups of the system 100, but are enabled to read archived messages.

Potential Uses of Persistent-IM-Groups

Micro-communities that are highly targeted to a specific interest can be formed around a persistent-IM-group, allowing members to communicate in real time using IM, SMS, or a conventional browser. For example, a small group of close friends can use a system 100 to coordinate their social activities. Similarly, a product development team could use a persistent-IM-group of the system 100 to communicate in real time to all members.

Imagine the persistent-IM-group as a stream of messages, and then imagine two types of subscribers: participants, and watchers (listeners). An administrator could post a badge or widget which would show the last IM conversation that occurred within a persistent-IM-group of the system 100. A subscriber could go to a wiki environment for a specific project, and on the right-hand side that subscriber could see a summary of the most recent messages.

Additionally, the open source community sometimes uses forums, where there may be only four active participants (active contributors), but perhaps 5000 followers. It may be very advantageous for the followers to have access to the communications, albeit in a read-only format. Another example might be a sporting event such as the Tour de France, where there are very few contributors but an extremely large number of followers.

Suppose a group of subscribers is participating in a software development project, and that group needs to exchange files such as source code. These subscribers sending segments of source code or other files could only work where a functional version of the user interface 200 is installed. Cellphone or BlackBerry subscribers would not receive the code segments, but instead only the accompanying text. The messaging engine 104 can strip pictures, specify fontsize, re-route SQL segments to e-mail or some other registered mechanism, and then send much smaller data to the cellphone.

Additionally, persistent-IM-groups can be very user-specific, region-specific, or time-specific, and thus not likely to be of general interest. One example might be planning for a family reunion or other event which requires coordination and reliable flow of information that is maintained in persistent storage.

Persistent-IM-groups can also be thought of as creating micro-social networks. The system 100 can use tagging format to make kind of a virtual social network, and can employ any/all different transport mechanisms within a specific provider's IM system, and can accommodate set top boxes, blackberry, even e-mail. The system 100 is agnostic to any specific communication network or IM protocol.

A persistent-IM-group facilitates instantaneous group communication without the overhead of having to manually create a chat room, invite all the participants to join the chat room, and then waiting for each participant to enter the room. Furthermore, the system 100 allows the group discussion to persist indefinitely, beyond the lifetime of the sessions of the original participants. Subscribers are automatically re-enrolled as soon as they sign back into an IM session, without having to recreate the original group IM environment from scratch.

The system 100 also provides server side archiving and messaging publishing capability, so that subscribers can read all messages that were sent, including messages that were received when that user was not signed into an IM. This can be useful when collaborating with a team of developers spread over multiple continents, or over multiple time zones.

Computer System Implementation

Figure 7:
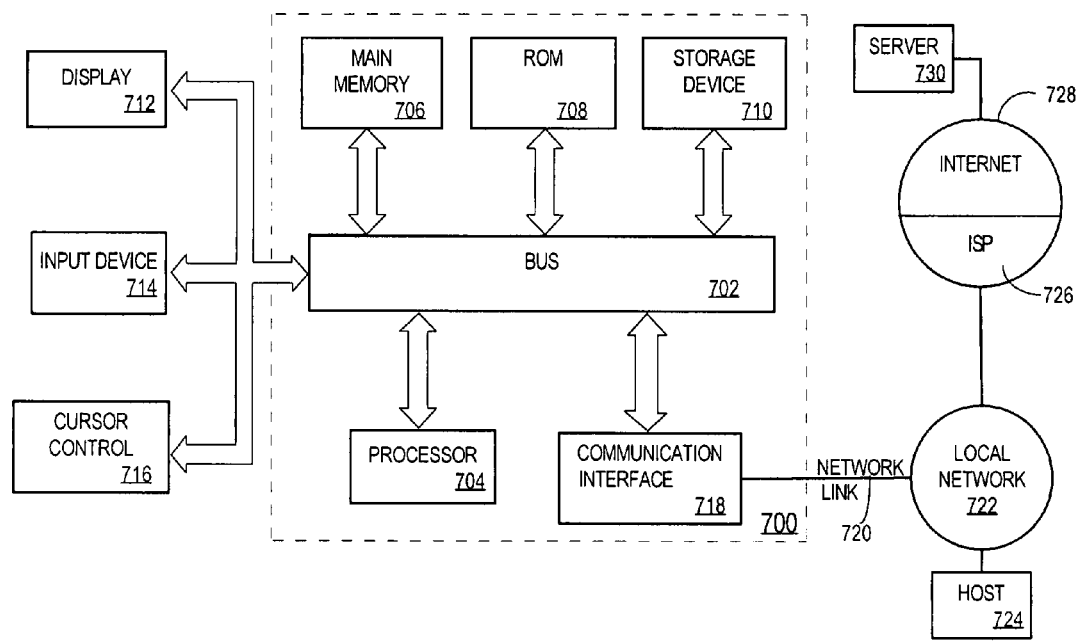
FIG. 7 shows a computer system upon which embodiments of the invention may be implemented.

FIG. 7 is a block diagram that illustrates a computer system 700 upon which an embodiment of the invention may be implemented. Computer system 700 includes a bus 702 or other message mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 700, various machine-readable media are involved, for example, in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data messages. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a message interface 718 coupled to bus 702. Message interface 718 provides a two-way data message coupling to a network link 720 that is connected to a local network 722. For example, message interface 718 may be an integrated services digital network (ISDN) card or a modem to provide a data message connection to a corresponding type of telephone line. As another example, message interface 718 may be a local area network (LAN) card to provide a data message connection to a compatible LAN. Wireless links may also be implemented. In any such implementation, message interface 718 sends and receives electrical, electromagnetic or optical signals that carry digital data streams representing various types of information.

Network link 720 typically provides data message through one or more networks to other data devices. For example, network link 720 may provide a connection through local network 722 to a host computer 724 or to data equipment operated by an Internet Service Provider (ISP) 726. ISP 726 in turn provides data message services through the world wide packet data message network now commonly referred to as the "Internet" 728. Local network 722 and Internet 728 both use electrical, electromagnetic or optical signals that carry digital data streams. The signals through the various networks and the signals on network link 720 and through message interface 718, which carry the digital data to and from computer system 700, are exemplary forms of transporting the information.

Computer system 700 can send messages and receive data, including program code, through the network(s), network link 720 and message interface 718. In the Internet example, a server 730 might transmit a requested code for an application program through Internet 728, ISP 726, local network 722 and message interface 718. The received code may be executed by processor 704 as it is received, and/or stored in storage device 710, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of administering instant messaging (IM), comprising:

receiving input from a plurality of subscribers in a conversation associated with a persistent-IM-group;

wherein the input is associated with the persistent-IM-group using a persistent-IM-group identifier that uniquely identifies the persistent-IM-group;

storing, at an instant messaging server, subscriber-to-identifier information that associates the plurality of subscribers with the persistent-IM-group identifier;

accessing the subscriber-to-identifier information to determine to whom to send messages that are part of the conversation associated with the persistent-IM-group;

sending over a network, to each subscriber of the conversation, messages to allow the subscriber to view contents of the conversation;

after all sessions associated with the persistent-IM-group identifier have been terminated:

persistently storing, at a centralized server, the contents of the conversation in association with the persistent-IM-group identifier;

establishing a new session associated with the persistent-IM-group identifier with at least one of the plurality of subscribers;

during the new session, allowing the at least one subscriber to see the persistently stored contents of the conversation associated with the persistent-IM-group identifier;

within the new session, receiving new input that represents new content for the conversation from the at least one subscriber of the plurality of subscribers;

by accessing the subscriber-to-identifier information, sending, over the network to each subscriber that is currently in a session associated with the persistent-IM-group at the time the new input is entered, messages to allow the subscriber to view the new content of the conversation;

by accessing the subscriber-to-identifier information, sending, over the network to each subscriber that establishes a session associated with the persistent-IM-group after the new input is entered, messages to allow the subscriber to view the new content of the conversation;

persistently storing at the centralized server the new content in association with the persistent-IM-group identifier as new content of the conversation ;

receiving an explicit request to end the persistent-IM-group; and in response to receiving the request, ceasing to allow subscribers to establish sessions associated with the persistent-IM-group identifier;

wherein the method is performed by one or more processors.

2. The method of claim 1, further comprising:
receiving a request from a subscriber to join the conversation; and
in response to receiving the request, providing to the subscriber at least a portion of the conversation contained in the data persistently stored at the centralized server that occurred prior to the subscriber joining the session.

3. The method of claim 1, further comprising:
prior to providing messages that include content of the conversation to a subscriber that is currently using a particular client, formatting the messages based on capabilities of the particular client.

4. The method of claim 1, further comprising:
prior to providing messages that include content of the conversation to a subscriber, filtering the content based on access rights of the subscriber.

5. The method of claim 1, further comprising:
adding subscribers to the persistent-IM-group;
screening behavior of subscribers; and
depending on the screening, removing various of the subscribers.

6. The method of claim 1, further comprising accessing the conversation from the centralized archive server using an archive interface.

7. The method of claim 6, further comprising:
designating messages of the conversation to be archived as public, semi-public, searchable by everyone, searchable only by subscribed persons, or searchable by no one.

8. The method of claim 7, further comprising:
blocking new subscribers from earlier archives;
facilitating different tiers of access according to different privilege levels of subscribers.

9. The method of claim 1, further comprising:
locating the persistent-IM-group within a social networking site.

10. The method of claim 9, wherein said locating step is achieved by an HTML widget.

11. The method of claim 1, further comprising, after all sessions associated with the persistent-IM-group identifier have been terminated, allowing the subscribers to search the contents of the conversation at the centralized server.

12. The method of claim 1, wherein the persistent-IM-group is one of a plurality of persistent-IM-groups and each of the plurality of persistent-IM-groups has a unique persistent-IM-group identifier.

13. The method of claim 1, wherein the centralized server stores a plurality of conversations associated with a plurality of persistent-IM-group identifiers, wherein a particular identifier in the plurality of persistent-IM-group identifiers uniquely identifies a particular persistent-IM-group.

14. The method of claim 1, further comprising publishing the stored conversation in real simple syndication (RSS) format.

15. The method of claim 1, further comprising:
storing one or more capabilities of each of a plurality of instant messaging clients, wherein each subscriber of the plurality of subscribers has a corresponding instant messaging client;
before sending messages to a particular subscriber of the plurality of subscribers to allow the particular subscriber to view contents of the conversation, formatting the messages based at least in part on the one or more capabilities of the instant messaging client corresponding to the particular subscriber.

16. The method of claim 15, wherein each of the plurality of instant messaging clients is one of an RSS reader or an SMS (short message service) client.

17. A system for managing a persistent-IM-group, comprising:
a messaging engine connected to a communication network and a plurality of clients;
an archiving module communicatively coupled to the messaging engine;
a persistent storage device communicatively coupled to the archiving module and the messaging engine;
wherein the messaging engine is configured to perform:
receiving input from a plurality of subscribers in a conversation associated with a persistent-IM-group;
wherein the input is associated with the persistent-IM-group using a persistent-IM-group identifier that uniquely identifies the persistent-IM-group;
storing subscriber-to-identifier information that associates the plurality of subscribers with the persistent-IM-group identifier;

accessing the subscriber-to-identifier information to determine to whom to send messages that are part of the conversation associated with the persistent-IM-group;

sending over a network, to each subscriber of the conversation, messages to allow the subscriber to view contents of the conversation;

after all sessions associated with the persistent-IM-group identifier have been terminated:
- establishing a new session associated with the persistent-IM-group identifier with at least one of the plurality of subscribers;
- within the new session, receiving new input that represents new content for the conversation from the at least one subscriber of the plurality of subscribers;
- by accessing the subscriber-to-identifier information, sending, over the network to each subscriber that is currently in a session associated with the persistent-IM-group at the time the new input is entered, messages to allow the subscriber to view the new content of the conversation; and
- by accessing the subscriber-to-identifier information, sending, over the network to each subscriber that establishes a session associated with the persistent-IM-group after the new input is entered, messages to allow the subscriber to view the new content of the conversation;

receiving an explicit request to end the persistent-IM-group; and in response to receiving the request, ceasing to allow subscribers to establish sessions associated with the persistent-IM-group identifier; and wherein the archiving module is configured to perform:
- after all sessions associated with the persistent-IM-group identifier have been terminated:
  - persistently storing, at the persistent storage device, the contents of the conversation in association with the persistent-IM-group identifier;
  - during the new session, allowing the at least one subscriber to see the persistently stored contents of the conversation associated with the persistent-IM-group identifier; and
  - persistently storing at the centralized server the new content in association with the persistent-IM-group identifier as new content of the conversation.

18. The system of claim 17, wherein the messaging engine is further configured to track one or more IM capabilities of each of the plurality of clients.

19. The system of claim 18, wherein the messaging engine is further configured to format messages based on the one or more IM capabilities of each of the plurality of clients.

20. The system of claim 17, wherein the plurality of clients comprise mobile phones, personal digital assistants (PDAs), and entertainment consoles.

21. The system of claim 17, wherein the messaging engine is further configured to publish content to an embeddable UI widget that a subscriber can embed into a website.

22. The system of claim 17, wherein the embeddable widget is a Web 2.0 badge.

23. The system of claim 17, wherein the messaging engine is further configured to allow an persistent-IM-group administrator add subscribers, screen behavior of subscribers, remove subscribers, and choose an identifier and ensure that the identifier is not already reserved.

24. The system of claim 17, wherein the messaging engine is further configured to display a user interface that lists all subscribers subscribed to a particular persistent-IM-group of the system, and provides a way for an administrator to remove certain subscribers.

25. The system of claim 17, wherein the archiving module is further configured to allow an administrator to designate messages to be archived as public, semi-public, searchable by everyone, searchable only by subscribed persons, or searchable by no one.

26. The system of claim 17, wherein the archiving module is configured to perform, after all sessions associated with the persistent-IM-group identifier have been terminated, allowing the subscribers to search the contents of the conversation at the centralized server.

27. A non-transitory machine-readable storage medium storing instructions for administering instant messaging (IM) that, when executed by one or more processors, causes the processors to perform the steps comprising:

receiving input from a plurality of subscribers in a conversation associated with a persistent-IM-group;

wherein the input is associated with the persistent-IM-group using a persistent-IM-group identifier that uniquely identifies the persistent-IM-group;

storing, at an instant messaging server, subscriber-to-identifier information that associates the plurality of subscribers with the persistent-IM-group identifier;

accessing the subscriber-to-identifier information to determine to whom to send messages that are part of the conversation associated with the persistent-IM-group;

sending over a network, to each subscriber of the conversation, messages to allow the subscriber to view contents of the conversation;

after all sessions associated with the persistent-IM-group identifier have been terminated:
- persistently storing at a centralized server the contents of the conversation in association with the persistent-IM-group identifier;
- establishing a new session associated with the persistent-IM-group identifier with at least one of the plurality of subscribers;
- during the new session, allowing the at least one subscriber to see the persistently stored contents of the conversation associated with the persistent-IM-group identifier;
- within the new session, receiving new input that represents new content for the conversation from the at least one subscriber of the plurality of subscribers;
- by accessing the subscriber-to-identifier information, sending, over the network to each subscriber that is currently in a session associated with the persistent-IM-group at the time the new input is entered, messages to allow the subscriber to view the new content of the conversation;
- by accessing the subscriber-to-identifier information, sending, over the network to each subscriber that establishes a session associated with the persistent-IM-group after the new input is entered, messages to allow the subscriber to view the new content of the conversation; and
- persistently storing at the centralized server the new content in association with the persistent-IM-group identifier as new content of the conversation;

receiving an explicit request to end the persistent-IM-group; and in response to receiving the request, ceasing to allow subscribers to establish sessions associated with the persistent-IM-group identifier.

28. The machine-readable storage medium of claim 27, wherein the instructions further comprise instructions that cause, after all sessions associated with the persistent-IM-group identifier have been terminated, allowing the subscribers to search the contents of the conversation at the centralized server.

29. The machine-readable medium of claim 27, wherein the persistent-IM-group is one of a plurality of persistent-IM-groups and each of the plurality of persistent-IM-groups has a unique persistent-IM-group identifier.

30. The machine-readable medium of claim 27, wherein the centralized server stores a plurality of conversations associated with a plurality of persistent-IM-group identifiers, wherein a particular identifier in the plurality of persistent-IM-group identifiers uniquely identifies a particular persistent-IM-group.

31. The machine-readable medium of claim 27, further comprising publishing the stored conversation in real simple syndication (RSS) format.

32. The machine-readable medium of claim 27, further comprising:
   storing one or more capabilities of each of a plurality of instant messaging clients, wherein each subscriber of the plurality of subscribers has a corresponding instant messaging client;
   before sending messages to a particular subscriber of the plurality of subscribers to allow the particular subscriber to view contents of the conversation, formatting the messages based at least in part on the one or more capabilities of the instant messaging client corresponding to the particular subscriber.

33. The machine-readable medium of claim 32, wherein each of the plurality of instant messaging clients is one of an RSS reader or an SMS (short message service) client.

* * * * *